(12) United States Patent
Baik

(10) Patent No.: US 8,369,416 B2
(45) Date of Patent: Feb. 5, 2013

(54) ERROR CONCEALMENT METHOD AND APPARATUS

(75) Inventor: Hyun-ki Baik, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1958 days.

(21) Appl. No.: 11/476,673

(22) Filed: Jun. 29, 2006

(65) Prior Publication Data

US 2007/0064812 A1    Mar. 22, 2007

Related U.S. Application Data

(60) Provisional application No. 60/694,998, filed on Jun. 30, 2005.

(30) Foreign Application Priority Data

Sep. 6, 2005    (KR) .................. 10-2005-0082858

(51) Int. Cl.
  *H04N 7/12*    (2006.01)
  *H04N 11/02*    (2006.01)
  *H04N 11/04*    (2006.01)

(52) U.S. Cl. .................................. 375/240.27

(58) Field of Classification Search .............. 375/240.27
See application file for complete search history.

(56) References Cited

U.S. PATENT DOCUMENTS

| 5,727,088 | A | * | 3/1998 | Kim ............................ 382/238 |
| 6,744,924 | B1 | | 6/2004 | Hannuksela et al. |
| 6,895,048 | B2 | | 5/2005 | Boice et al. |
| 7,039,109 | B2 | * | 5/2006 | Pelagotti et al. ......... 375/240.16 |
| 7,515,637 | B2 | * | 4/2009 | Payson ..................... 375/240.16 |
| 7,564,973 | B2 | * | 7/2009 | Matsumura et al. ......... 380/205 |
| 7,773,828 | B2 | * | 8/2010 | Sakata et al. .................. 382/294 |
| 2003/0012286 | A1 | | 1/2003 | Ishtiaq et al. |
| 2006/0104365 | A1 | * | 5/2006 | Li et al. ..................... 375/240.27 |

FOREIGN PATENT DOCUMENTS

| JP | 2001-514830 A | 9/2001 |
| KR | 10-1996-0030703 A | 8/1996 |
| KR | 10-2001-0010753 A | 2/2001 |

(Continued)

OTHER PUBLICATIONS

Baccichet, P.; Chimienti, A.; , "A low complexity concealment algorithm for the whole-frame loss in H.264/AVC," Multimedia Signal Processing, 2004 IEEE 6th Workshop on , vol., no., pp. 279-282, Sep. 29-Oct. 1, 2004 doi: 10.1109/MMSP.2004.1436547.*

(Continued)

*Primary Examiner* — Mehrdad Dastouri
*Assistant Examiner* — Jeremaiah Hallenbeck-Huber
(74) *Attorney, Agent, or Firm* — Sughrue Mion, PLLC

(57) ABSTRACT

An error concealment method and apparatus are provided. The error concealment method includes determining a reference direction of a lost frame by determining whether a scene change between frames has occurred based on the lost frame; extracting concealment reference points for a pixel of the lost frame by using at least one frame except for the lost frame according to the determined reference direction; obtaining a concealment pixel value of the pixel of the lost frame by giving weight values to the extracted concealment reference points; and restoring the lost frame by performing a concealment of the pixel using the concealment pixel value. According to the error concealment method and apparatus, when a frame loss occurs in an appliance that receives/outputs compressed moving images, error concealment in the unit of a frame can be effectively performed, and the deterioration of picture quality due to the error propagation can be minimized.

20 Claims, 5 Drawing Sheets

FOREIGN PATENT DOCUMENTS

| KR | 10-2002-0073680 A | 9/2002 |
|---|---|---|
| KR | 10-2003-0032231 A | 4/2003 |
| KR | 10-2005-0019876 A | 3/2005 |
| KR | 10-2005-0025568 A | 3/2005 |

OTHER PUBLICATIONS

Belfiore, S.; Grangetto, M.; Magli, E.; Olmo, G.; , "Concealment of whole-frame losses for wireless low bit-rate video based on multiframe optical flow estimation," Multimedia, IEEE Transactions on , vol. 7, No. 2, pp. 316-329, Apr. 2005 doi: 10.1109/TMM.2005. 843347 URL: http://ieeexplore.ieee.org/stamp/stamp.jsp?tp=&arnumber=1407904&isnumber=30529.*

Baccichet, P.; Chimienti, A.; , "A low complexity concealment algorithm for the whole-frame loss in H.264/AVC," Multimedia Signal Processing, 2004 IEEE 6th Workshop on , vol., no., pp. 279-282, Sep. 29-Oct. 1, 2004 doi: 10.1109/MMSP.2004.1436547 URL: http://ieeexplore.ieee.org/stamp/stamp.jsp?tp=&arnumber=1436547&isnumber=30945.*

Al-Mualla, M.E.; Canagarajah, C.N.; Bull, D.R.; , "Multiple-reference temporal error concealment," Circuits and Systems, 2001. ISCAS 2001. The 2001 IEEE International Symposium on , vol. 5, no., pp. 149-152 vol. 5, 2001.*

Soo-Chang Pei et al: "Novel error concealment method with adaptive prediction to the abrupt and gradual scene change" IEEE Transactions on Multimedia (Online), vol. 6, No. 1, Feb. 1, 2004, pp. 158-173, URL:http://ieeexplore.ieee.org/ie15/6046/28207/01261894/pdf?tp=&arnumber=1261894&isnumber=28207> [retrieved on Oct. 5, 2006].

Soo-Chang Pei et al.: "Novel error concealment method with adaptive prediction of abrupt and gradual scene changes", Pattern Recognition, 2002. Proceedings. 16$^{th}$ International Conference on Quebec City, Que., Canada Aug. 11-15, 2002, Los Alamitos, Ca., USA, IEEE Comput. Soc, US, vol. 3, pp. 827-830.

Soo-Chang Pei; Yu-Zuong Chou: "Scene-effect detection and insertion MPEG encoding scheme for video browsing and error concealment", [Online] vol. 7, No. 4, Aug. 1, 2005, pp. 606-614, http://ieeexplore.ieee.org/ie15/6046/31485/01468146.pdf?tp=arnumber=14681467isnumber=31485.

Jin-Hau Kuo et al.: "A hybrid semantic scene-based error resilient system" Communications Systems, 2002. ICCS 2002. The 8$^{th}$ International Conference on Nov. 25-28, 2002, Piscataway, NJ, USA, IEEE, vol. 2, Nov. 25, 2002, pp. 973-976, ISBN: 0-7803-7510-6.

Kasier S et al.: "Comparison of error concealment techniques for an MPEG-2 video decoder in terrestrial TV-broadcasting <1>", May 1999, Signal Processing. Image Communication, Elsevier Science Publishers, Amsterdam, NL pp. 655-676, ISSN:0923-5965.

* cited by examiner

LOST FRAME

ERROR CONCEALMENT METHOD AND APPARATUS

CROSS-REFERENCE TO RELATED APPLICATIONS

This application claims priority from Korean Patent Application No. 10-2005-0082858 filed on Sep. 6, 2005 in the Korean Intellectual Property Office, and U.S. Provisional Patent Application No. 60/694,998 filed on Jun. 30, 2005 in the United States Patent and Trademark Office, the disclosures of which are incorporated herein by reference in their entirety.

BACKGROUND OF THE INVENTION

1. Field of the Invention

Methods and apparatuses consistent with the present invention relate to error concealment, and more particularly, to error concealment that can improve the picture quality of video data by concealing frame loss and reducing error propagation.

2. Description of the Related Art

In line with increasing transmission of moving images over the radio network environments, developments in the radio network technologies have also been making rapid progress. Currently, extensive research and developments have been made in technologies for compressing such moving image frames. Frame compression technologies, such as H.263, H.263+, MPEG-1, MPEG-2, MPEG-4 have been established as international standards by the International Standards Organization. Since data produced using these compression technologies has high compression rates, it can be easily transmitted even in systems that are provided with channels having limited bandwidths.

However, in the case where the data compression rate is high, data being restored may be severely damaged due to an occurrence of error in the transmitted data. That is, packet loss frequently occurs due to a radio-wave interference caused by obstacles, and this causes a loss of video data to occur. In order to heighten the compression efficiency of the video data being transmitted, data of the previous frames are referred to. Accordingly, after the error occurrence due to the loss of video data, an error propagation phenomenon continues. In particular, the frame loss causes a serious error and error propagation phenomena in comparison to the slice or macroblock errors.

In order to overcome the above-described drawbacks, many attempts to encode moving image (hereinafter referred to as "video") data so that it has error resilience have been made in many fields. A frame error concealment technique has been proposed as one method for realizing this resilience. The frame error concealment is a method for reducing the influence of an error when video frames, in which the error exists, are received and decoded by a video decoder. This error concealment is different from error correction, which is a method of correcting incorrect data.

Among error concealment techniques, a temporal prediction error concealment conceals an error by using redundant information between successive frames according to video information, and spatial prediction error concealment conceals an error in the same frame, including lost information, by using spatial redundancy. Spatial prediction error concealment compensates for damaged macroblocks by using information of undamaged macroblocks in the present frame without using the temporal redundancy. For this, error concealment techniques which replace the lost block by a neighboring macroblock or which uses various interpolation methods have been proposed. Temporal prediction error concealment is a technique for referring to a frame existing in a temporarily different place in order to restore information of the lost macroblock in the present frame by using the temporal correlation between successive frames. Temporal prediction error concealment can be classified as a single-frame error concealment where one frame is referred to during the restoration of the video frame, and a multi-frame error concealment where two or more frames are referred to.

Several frame error concealment techniques have been proposed according to a method for obtaining a motion vector of a lost macroblock. One method uses a previously received frame, and another method uses two or more previously received frames. The method that uses a previously received frame may be further classified into three methods according to the method of using the previously received frame (hereinafter referred to as a "previous frame") as follows.

The first method uses a macroblock in the same position in a previous frame. The second method restores the lost motion vector by using an intermediate value or an average value of motion vectors neighboring the lost macroblock of the presently received frame. The third method uses a macroblock that is most similar to the present frame by estimating the neighboring pixel values of the lost macroblock from the previous frame.

The multi-frame error concealment technique restores the motion vector using the methods used for the single frame concealment technique. However, in order to find the lost macroblock, the multi-frame error concealment technique does not search for only one previous frame, but for at least two previous frames.

Prior to the explanation of the problems of a related art frame error concealment technology, the construction of a general video decoder will be briefly explained in the following. Generally, a video decoder restores the original video signal by performing a variable-length decoding and an inverse quantization of a compressed video bitstream. FIG. 1 is a block diagram illustrating the construction of a related art video decoder.

Referring to FIG. 1, a buffer stores an input bitstream, and a variable length decoding unit 12 performs a variable-length decoding of the bitstream stored in the buffer, and outputs video information generated as a result of the variable length decoding to an inverse quantization unit 13 and a motion compensation unit 15. The inverse quantization unit 13 receives quantization information output from the variable length decoding unit 12, and performs an inverse quantization of the variable-length-decoded data. An inverse discrete cosine transform (IDCT) unit 14 performs an IDCT of the inverse-quantized data output from the inverse quantization unit 13. A motion compensation unit 15 generates motion-compensated video data using the motion information and the video data output from the variable length decoding unit 12. An addition unit adds the video data motion-compensated by the motion compensation unit 15 and the video data inverse-DCT-transformed by the IDCT unit 14. A storage unit 17 stores the video data output from the addition unit 16.

As described above, the video decoder as illustrated in FIG. 1 performs the variable length decoding by reading the video data according to the decoding capability of the video decoder after storing the input bitstream in the buffer 11. However, if an error occurs during the transmission of the video data and lost data, which cannot be variable-length-decoded, is included in the input video data, the lost error data accumulates to affect subsequent images.

FIG. 2a is a view explaining the error propagation when a frame loss occurs in the related art video decoder. If an entire frame is lost, as depicted by numeral 21 in FIG. 2a, this affects macroblocks that refer to a forward frame causing serious picture quality deterioration. That is, the lost frame affects all the following frames 22, 23 and 24 causing the picture quality to deteriorate. In order to overcome the drawback due to the error occurrence as described above, a frame error concealment method has been proposed as one method for realizing error resilience. In the whole description of the present invention, the frame error concealment means a method for reducing the influence of an error in decoding subsequent data if the error occurs and an entire frame is not received in the decoder.

FIG. 2b is a view explaining the method of referring to macroblocks of the previous frame in a related art frame-unit error concealment method. This method brings a macroblock 30-1 of the previous frame 30 that corresponds to a macroblock 40-1 of a lost frame 40 by applying a zero-point motion vector 35 to the previous frame 30 in order to restore the macroblock 40-1 of the lost frame 40.

However, the method as illustrated in FIG. 2b refers to the data of the previous frame 30, and thus if a scene is changed or there is a great change between frames, a large prediction error occurs reducing the picture quality.

FIG. 2c is a view explaining a method of predicting pixels of a lost frame through bidirectional extrapolation in a related art frame-unit error concealment method.

The method of FIG. 2c performs a bidirectional concealment reference, i.e., a forward concealment reference and a backward concealment reference. The forward concealment reference operates as follows.

The forward concealment reference performs an extrapolation of motion vectors in the unit of a macroblock with respect to the previous frame so that the previous frame corresponds to the lost frame. In FIG. 2c, the reference numeral 55 is a motion vector of a macroblock 60-1 of a frame 60. Extrapolation is performed with respect to a frame 70 after a motion vector 55, and a motion vector 65 that corresponds to a pixel 70-0-1 is obtained. Accordingly, a pixel 60-0-1 in the frame 60 is selected as a concealment reference point of the pixel 70-0-1 in the frame 70. Through this process, the pixel 70-0-1 may have more than zero concealment reference points with respect to the previous frame 60. If no concealment reference point exists, the pixel in the same position in the previous frame 60 is determined as the concealment reference point. By contrast, if plural concealment reference points exist, an average point of the concealment reference points is determined as the forward concealment reference point.

The backward concealment reference operates as follows.

Concealment reference points 80-0-1, 80-0-2 and 80-0-3, which correspond to the pixel 70-0-1 of the lost frame, are searched for using motion vectors 75, 76 and 77 of respective macroblocks of a backward frame 80 as shown in FIG. 2c. The following process is the same as the forward concealment reference described above.

The average value of the forward and backward concealment values obtained through the above process becomes the concealment value of the pixel 70-0-1 of the lost frame 70. The lost frame 70 can be restored by performing the bidirectional reference for the respective pixels.

However, the method as illustrated in FIG. 2c has the following problems.

First, its prediction accuracy is degraded due to the bidirectional reference during a scene change. If the scene is changed in the backward frame of the lost frame, there would be no correlation between the lost frame and the backward frame, while if the scene is changed in the forward frame of the lost frame, there would be no correlation between the lost frame and the forward frame. Since the method as illustrated in FIG. 2c performs the bidirectional reference in the cases as described above, the prediction accuracy for the respective pixels of the lost frame is lowered.

Second, since the error is concealed using only one forward frame when the forward reference is performed, the probability of predicting accurate pixels is lowered when the concealment of an edge part of the image is performed or when an object in the image disappears and then appears again.

Third, since the prediction is performed by simply obtaining the average value with respect to the reference points that conceal the lost frame, inaccurate information of the reference points have the same weight value in performing the prediction which lowers the prediction accuracy.

SUMMARY OF THE INVENTION

Exemplary embodiments of the present invention overcome the above disadvantages and other disadvantages not described above. Also, the present invention is not required to overcome the disadvantages described above, and an exemplary of the present invention may not overcome any of the problems described above.

The present invention provides an error concealment method and apparatus that can minimize the deterioration of picture quality due to a lost frame unit by extracting concealment reference points by determining a reference direction according to a scene change between frames, giving weight values to the extracted concealment reference points, and performing a restoration of the lost frame through the concealment of a pixel of the lost frame according to the weight values.

According to an aspect of the present invention, there is provided an error concealment method which includes determining a reference direction of a lost frame by determining whether a scene change between frames has occurred based on the lost frame; extracting concealment reference points for a pixel constituting the lost frame by using at least one frame except for the lost frame according to the determined reference direction; obtaining a concealment pixel value of the pixel constituting the lost frame by giving weight values to the extracted concealment reference points; and restoring the lost frame by performing a concealment of the pixel using the concealment pixel value.

According to another aspect of the present invention, there is provided an error concealment apparatus which includes a reference direction determination unit determining a reference direction of a lost frame by determining whether a scene change between frames has occurred based on the lost frame; a concealment reference point extraction unit extracting concealment reference points for a pixel constituting the lost frame by using at least one frame except for the lost frame according to the determined reference direction; a weight value calculation unit obtaining a concealment pixel value of the pixel constituting the lost frame by giving weight values to the extracted concealment reference points; and a frame restoration unit restoring the lost frame by performing a concealment of the pixel using the concealment pixel value.

BRIEF DESCRIPTION OF THE DRAWINGS

The above and other aspects of the present invention will become more apparent from the following detailed description of exemplary embodiments taken in conjunction with the accompanying drawings, in which.

DETAILED DESCRIPTION OF EXEMPLARY EMBODIMENTS

Figure 1:
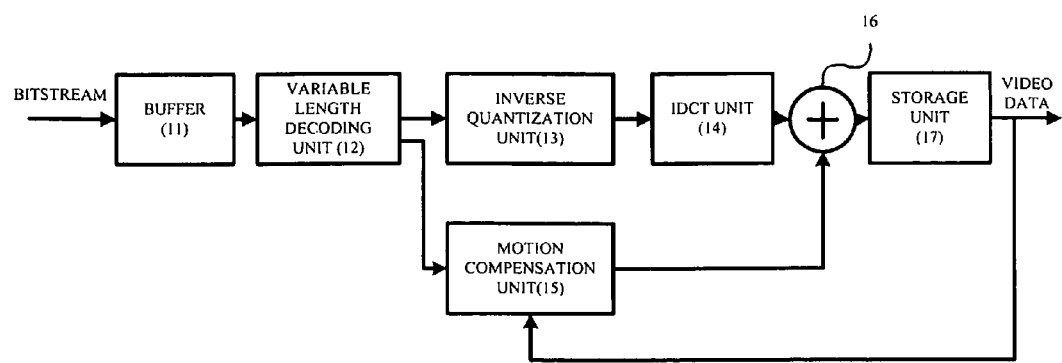
FIG. 1 is a block diagram illustrating the construction of a related art video decoder.
Figure 2A:
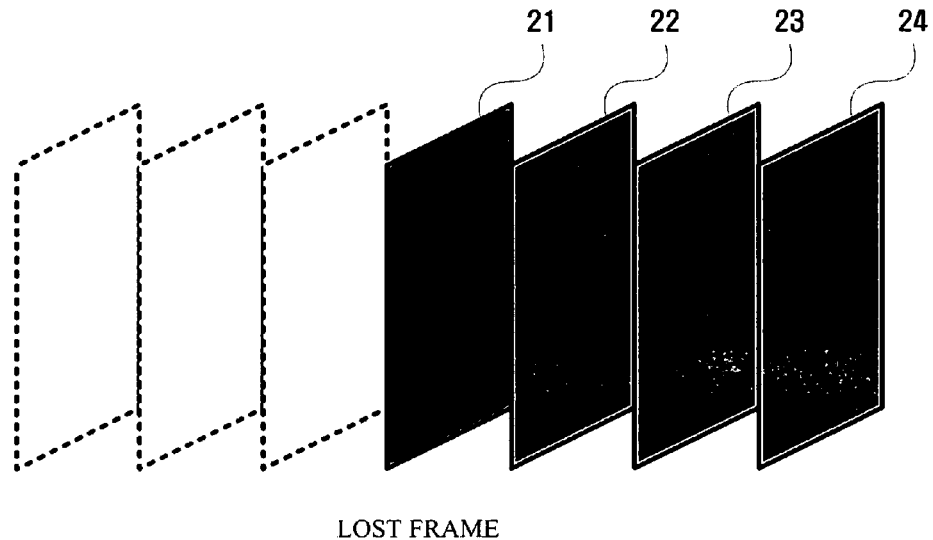
FIG. 2a is a view explaining the error propagation when a frame loss occurs in the related art video decoder.
Figure 2B:
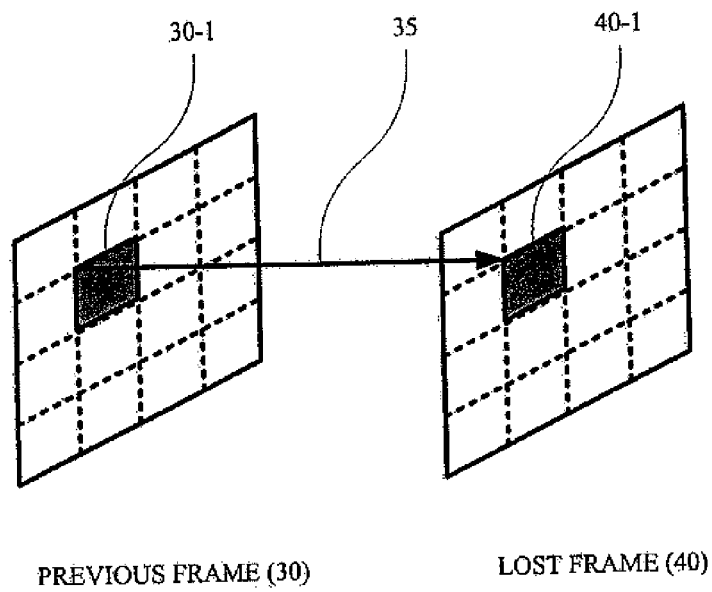
FIG. 2b is a view explaining the method of referring to macroblocks of the previous frame in a related art frame-unit error concealment method.
Figure 2C:
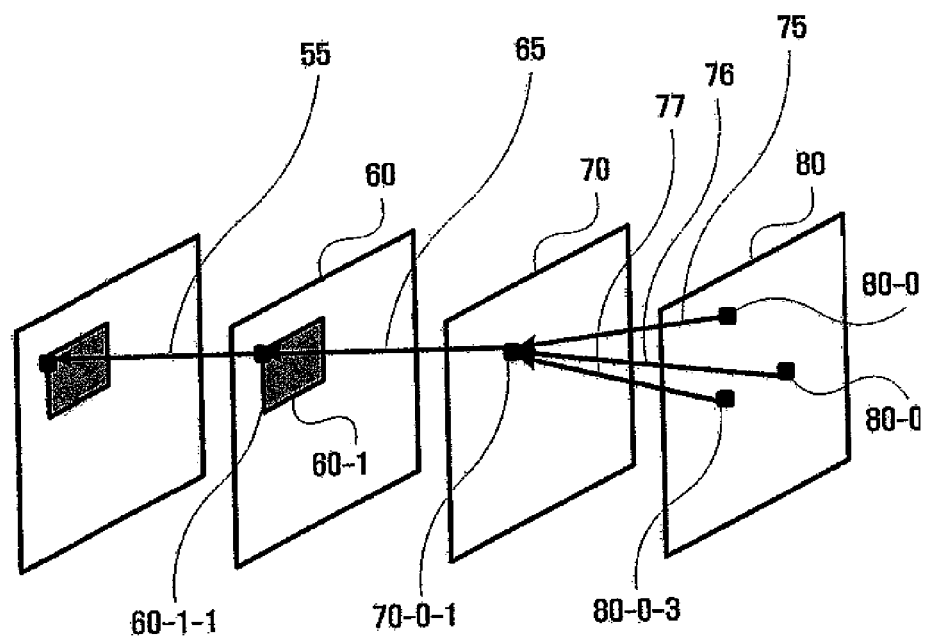
FIG. 2c is a view explaining a method of predicting pixels of a lost frame through bidirectional extrapolation in a related art frame-unit error concealment method.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but will be implemented in diverse forms. The matters defined in the description, such as the detailed construction and elements, are nothing but specific details provided to assist those of ordinary skill in the art in a comprehensive understanding of the invention, and the present invention is only defined within the scope of appended claims. In the whole description of the present invention, the same drawing reference numerals are used for the same elements across various figures.

Hereinafter, exemplary embodiments of the present invention will be described with reference to the accompanying drawings illustrating block diagrams and flowcharts for explaining error concealment method and apparatus according to the exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Figure 3:
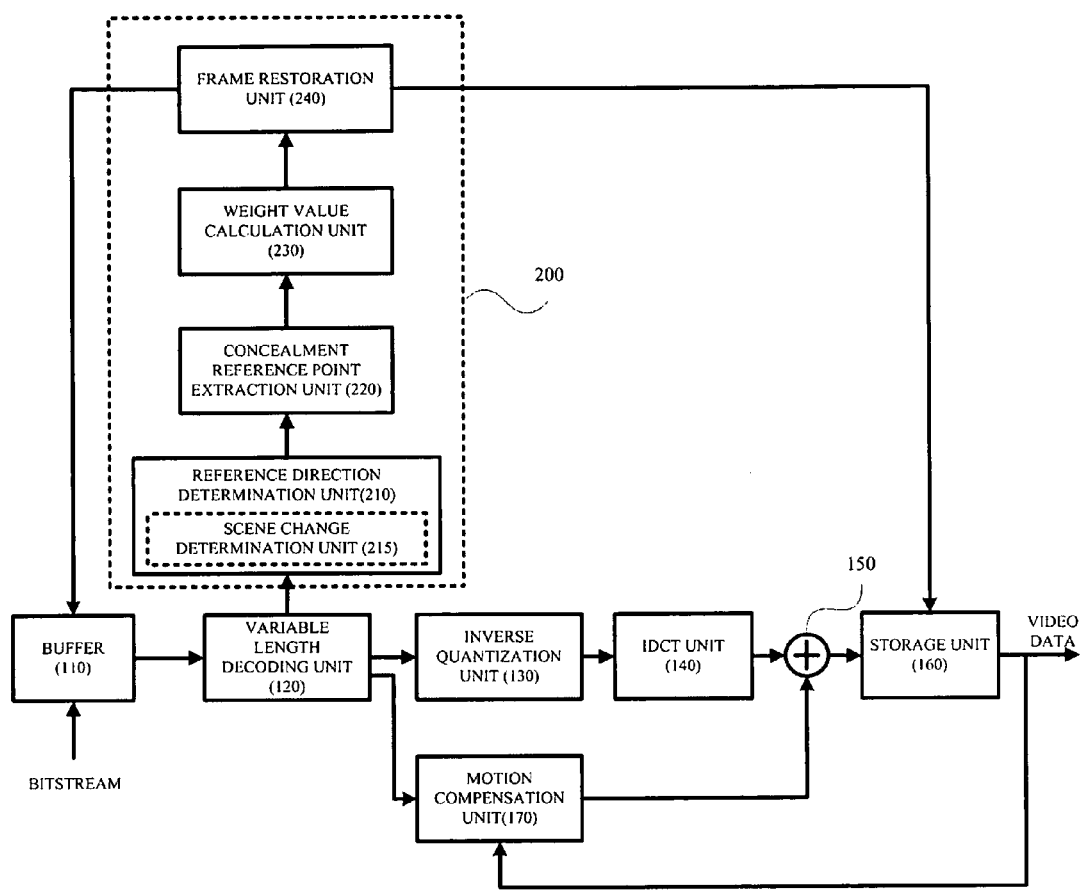
FIG. 3 is a block diagram illustrating the construction of a video decoder that includes an error concealment apparatus according to an exemplary embodiment of the present invention.

FIG. 3 is a block diagram illustrating the construction of a video decoder that includes an error concealment apparatus according to an exemplary embodiment of the present invention. Referring to FIG. 3, the video decoder includes an error concealment apparatus 200 according to an exemplary embodiment of the present invention, in addition to the related art construction including a buffer 110, a variable length decoding unit 120, an inverse quantization unit 130, an inverse discrete cosine transform (IDCT) unit 140, an addition unit 150, a storage unit 160, and a motion compensation unit 170. The error concealment apparatus 200 includes a reference direction determination unit 210, a concealment reference point extraction unit 220, a weight value calculation unit 230, and a frame restoration unit 240.

Similar to related art decoder, the buffer 110 stores an input bitstream, and the variable length decoding unit 120 performs a variable-length decoding of the bitstream stored in the buffer 110, and outputs video information generated as a result of the variable length decoding to the inverse quantization unit 130 and the motion compensation unit 170. The inverse quantization unit 130 receives quantization information output from the variable length decoding unit 120, and performs an inverse quantization of the variable-length-decoded data. The IDCT unit 140 performs an IDCT of the inverse-quantized data output from the inverse quantization unit 130. The motion compensation unit 170 generates motion-compensated video data using the motion information and the video data output from the variable length decoding unit 120. The addition unit 150 adds the video data motion-compensated by the motion compensation unit 170 and the video data inverse-DCT-transformed by the IDCT unit 140. The storage unit 160 stores the video data output from the addition unit 150.

If the video information, which is generated when the variable length decoding unit 120 performs the variable-length-decoding of the bitstream stored in the buffer 110, includes an abnormal error, the corresponding video information is output to the error concealment apparatus 200 in order to be subjected to an error concealment process.

Figure 5:
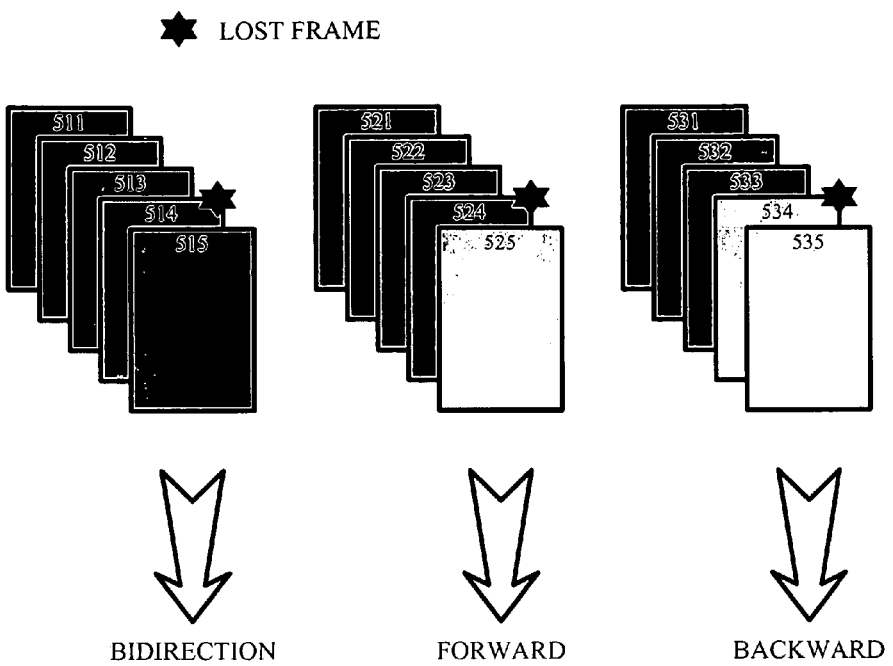
FIG. 5 is a view explaining the determining of a reference direction of a lost frame in an error concealment method according to an exemplary embodiment of the present invention.

The reference direction determination unit 210 receives a lost frame output from the variable length decoding unit 120, and determines the reference direction of the lost frame. That is, the reference direction determination unit 210 determines the reference direction of the lost frame by determining whether a scene change occurs between frames on the basis of the lost frame. The reference direction determination unit 210 includes a scene change determination unit 215 which determines whether the scene change occurs between frames on the basis of the lost frame by analyzing video data of the previous frame preceding the lost frame and the frame following the lost frame. FIG. 5 is a view explaining the determining of the reference direction of the lost frame in an error concealment method according to an exemplary embodiment of the present invention. In FIG. 5, a process of determining the reference direction by determining the scene change between frames is illustrated. It is determined that the scene has been changed when the difference between the frame preceding the lost frame and the frame following the lost frame exceeds a predetermined value. In addition, in order to reduce an amount of calculation, the scene change may be determined using the difference between DC coefficients or a motion vector distribution.

Frames 511 to 515 illustrated in the left part of FIG. 5 refer to a case where no scene change has occurred. In this case, a bidirectional reference for extracting concealment reference points from the previous frames 511 to 513 and the following frame 515 of the lost frame 514 is performed. That is, since it is determined by the scene change determination unit 215 that no scene change has occurred, it is determined to perform the bidirectional reference.

In the middle part of FIG. 5, a case where a scene change has occurred in a frame 525 following a lost frame 524 among five frames 521 to 525 is illustrated. In this case, the lost frame 524 has no correlation with the frame 525, and a forward reference for extracting the concealment reference points from the previous frames 521 to 523 of the lost frame 524 is performed. That is, since it is determined by the scene change determination unit 215 that the scene change has occurred and the lost frame is the same as the previous frame that precedes the lost frame, it is determined to perform the forward reference.

In the right part of FIG. 5, a case where a scene change has occurred in a lost frame 534 among five frames 531 to 535 is illustrated. In this case, the lost frame 534 has no correlation with the previous frame 533, and a backward reference for extracting the concealment reference points from the frame 535 that follows the lost frame 534 is performed. That is, since the lost frame is the same as the frame following the lost frame, it is determined to perform the backward reference.

The concealment reference point extraction unit 220 performs an extraction of concealment reference points for a pixel constituting the lost frame using at least one frame except for the lost frame. That is, if it is determined to perform the forward reference by the scene change determination unit 215, the concealment reference point extraction unit 220 extracts the concealment reference points using the plural previous frames. On the other hand, if it is determined to performed the backward reference by the scene change determination unit 215, the concealment reference point extraction unit 220 extracts the concealment reference points using one or more following frames. Also, if it is determined to perform the bidirectional reference by the scene change determination unit 215, the concealment reference point extraction unit 220 extracts the concealment reference points using the plural previous frames and one or more following frames.

Figure 6:
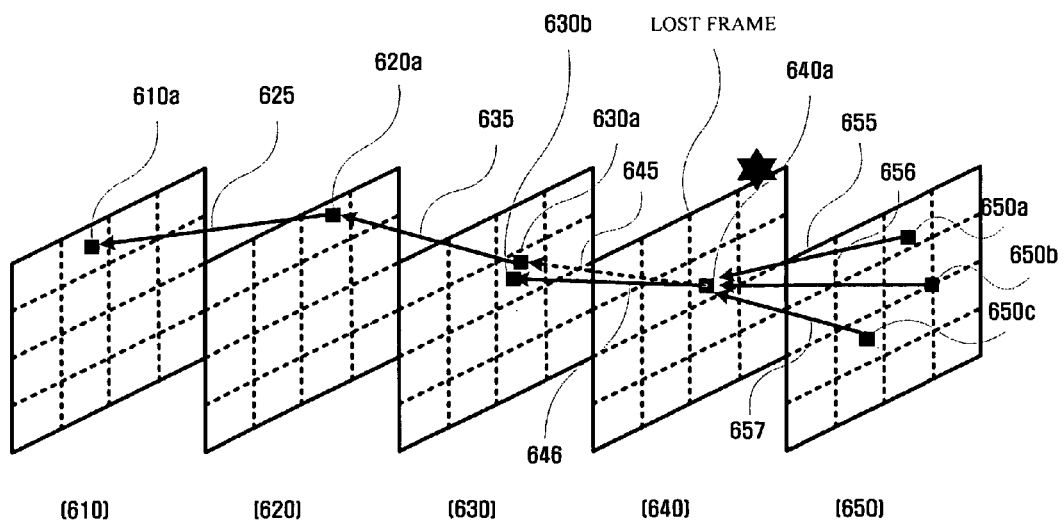
FIG. 6 is a view explaining extracting concealment reference points for a pixel constituting a lost frame in an error concealment method according to an exemplary embodiment of the present invention.

In FIG. 6, the above-described process is illustrated. FIG. 6 is a view explaining extracting concealment reference points for a pixel constituting a lost frame in an error concealment method according to an exemplary embodiment of the present invention. In FIG. 6, five frames 610 to 650 are sequentially arranged, and an error has occurred in the frame 640.

First, a process of extracting the forward concealment reference points will be explained. In order to obtain the forward concealment reference points, an average of motion vectors of the previous frames of the lost frame 640 should be obtained. A motion vector 645 directed from a pixel 640a of the lost frame 640 to a pixel 630a is found through an extrapolation of the pixel 640a, and an average of a motion vector 635 directed from the pixel 630a to a pixel 620a and a motion vector 625 directed from the pixel 620a, which the motion vector 635 refers to, to a pixel 610a is obtained. Accordingly, a pixel 630b, which the motion vector 646 directed from the pixel 640a to the pixel 630b refers to, is extracted as the concealment reference point. Through the above-described process, the forward concealment reference points for the pixel 640a of the lost frame 640 are extracted.

Second, a process of extracting the backward concealment reference points is as follows. Points that refer to the pixel 640a of the lost frame 640 are extracted as the concealment reference points by making respective points 650a, 650b and 650c of the following frame 650 of the lost frame 640 correspond to the lost frame 640 through motion vectors. In this case, since the respective pixels 650a, 650b and 650c have motion vectors 655, 656 and 657 that correspond to the pixel 640a of the lost frame, the pixels 650a, 650b and 650c that exist in the following frame 650 can be extracted as the following concealment reference points.

The weight value calculation unit 230 obtains a concealment pixel value of the lost frame by giving weight values to the extracted concealment reference points. Specifically, if it is determined to perform the forward reference by the scene change determination unit 215, the weight value calculation unit 230 obtains the concealment pixel value of the pixel constituting the lost frame by giving the forward weight values to the extracted concealment reference points, while if it is determined to perform the backward reference, the weight value calculation unit obtains the concealment pixel value of the pixel constituting the lost frame by giving the backward weight values to the extracted concealment reference points. Also, if it is determined to perform the bidirectional reference, the weight value calculation unit obtains the concealment pixel value by giving the forward weight values and the backward weight values and then giving directional weight values according to the reference directions to the extracted concealment reference points.

Here, higher forward or backward weight value is given as the absolute value of the motion vector becomes smaller, while lower forward or, backward weight value is given as the absolute value of the motion vector becomes larger. This is because an error between pixels becomes larger as the magnitude of the motion vector becomes larger. The forward weight value is determined by Equation (1), and the backward weight value is determined by Equation (2).

$$w_{fi} = \frac{1}{1+|MV_i|} \times \frac{1}{\sum_{k=1}^{N}\left(\frac{1}{1+|MV_k|}\right)}, \left[\sum_{i=1}^{N} w_{fi} = 1\right] \quad (1)$$

$$w_{bi} = \frac{1}{1+|MV_i|} \times \frac{1}{\sum_{k=1}^{M}\left(\frac{1}{1+|MV_k|}\right)}, \left[\sum_{i=1}^{M} w_{bi} = 1\right] \quad (2)$$

Here, $w_{fi}$ is a forward weight value that is multiplied by the pixel value of the i-th forward reference point among the pixels of the previous frames, and $w_{bi}$ is a backward weight value that is multiplied by the pixel value of the i-th backward reference point among the pixels of the following frames. $|MV_i|$ is the magnitude of the motion vector of the i-th reference point, $|MV_k|$ is the magnitude of the motion vector of the k-th reference point, N is the number of forward reference points, and M is the number of backward reference points. As can be seen from Equations (1) and (2), the weight values are in inverse proportion to $1+|MV_i|$. This is because the term $$\frac{1}{\sum_{k=1}^{N}\left(\frac{1}{1+|MV_k|}\right)}$$

on the right side of Equation (1) is a coefficient for making the sum of the weight values become "1", and thus the sum of the weight values becomes "1"

$$\left(\sum_{i=1}^{N}w_{bi}=1\right).$$

The same explanation as described above can be applied to Equation (2). Consequently, both the forward weight value and the backward weight value are inversely proportional to the magnitude of the motion vector.

The directional weight values can be determined by Equation (3).

$$dw_f = \frac{ibn_b}{ibn_f + ibn_b}, \qquad (3)$$

$$dw_b = \frac{ibn_f}{ibn_f + ibn_b}$$

Here, $dw_f$ is the forward weight value, $dw_b$ is the backward weight value, $ibn_f$ is the number of intra macroblocks of the previous frame, and $ibn_b$ is the number of intra macroblocks of the following frame, respectively. Equation (3) uses the correlation between the lost frame and the previous frame and between the lost frame and the following frame, and is directly applied to the bidirectional reference. The forward weight value $dw_f$ becomes larger as the number of intra macroblocks $ibn_b$ existing in the following frame rather than the previous frame becomes larger, since the possibility of referring to the following frame becomes smaller and the possibility of referring to the forward previous frame becomes greater as the number of intra macroblocks existing in the following frame rather than the previous frame becomes larger. Since the backward weight value $dw_b$ has the same characteristic as the forward weight value, the detailed explanation thereof will be omitted.

After the weight values are calculated by the above-described equations, the concealment pixel value for the pixel constituting the lost frame is determined by Equation (4).

$$p(x,y) = dw_f \bullet \sum_{k=1}^{N} w_{fk} \cdot p(x_{fk}, y_{fk}) + dw_b \bullet \sum_{k=1}^{M} w_{bk} \cdot p(x_{bk}, y_{bk}) \qquad (4)$$

Here, p(x,y) is the concealment pixel value for a pixel in the lost frame, $dw_f$ is the forward weight value, $dw_b$ is the backward weight value, $w_{fk} \cdot p(x_{fk},y_{fk})$ is a value obtained by multiplying the pixel value of the k-th forward reference point by the forward weight value, and $w_{bk} \cdot p(x_{bk},y_{bk})$ is a value obtained by multiplying the pixel value of the k-th backward reference point by the backward weight value, respectively. Equation (4) is useful when it is applied to the bidirectional reference. However, it can be applied to a case where either the forward reference or the backward reference is performed, in a manner that it gives the weight value of "1" to the corresponding reference direction and gives the weight value of "0" to the non-referred reference direction.

The frame restoration unit 240 restores the lost frame by performing the concealment using the concealment pixel value obtained by the above-described equations. The frame restored by the frame restoration unit 240 is sent to the buffer 110 or stored in the storage unit 160.

Figure 4:
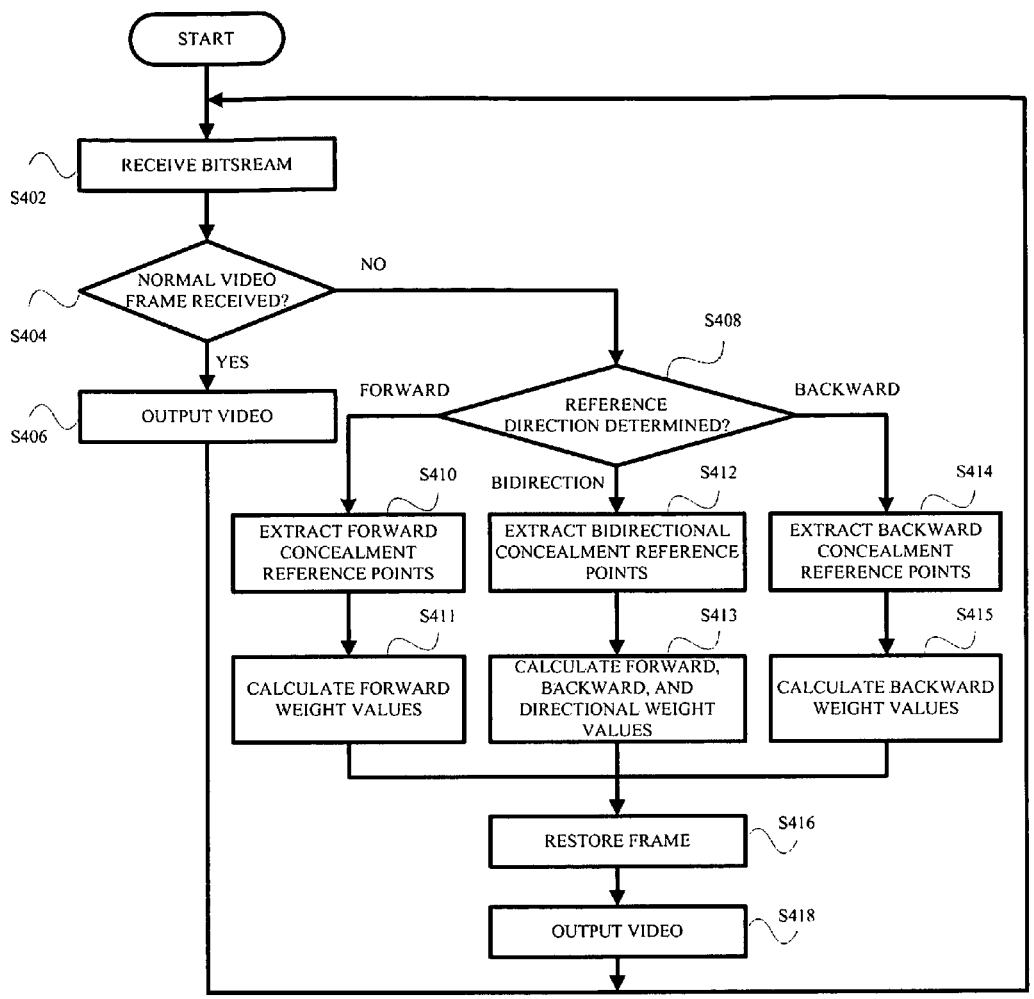
FIG. 4 is a flowchart illustrating an error concealment method according to an exemplary embodiment of the present invention.

An error concealment method using the error concealment apparatus according to an exemplary embodiment of the present invention will be explained with reference to FIG. 4 in the following.

If a bit stream is received in a video decoder according to an exemplary embodiment of the present invention (S402), it should be determined whether the received bit stream corresponds to normal video frames through several processes (S404). If the normal video frames are received without error, they are directly processed to output the corresponding video (S406). However, if an error occurs in the received video frame, an error concealment is performed by the error concealment apparatus 200 according to the exemplary embodiment of the present invention.

First, the reference direction of a lost frame is determined by determining whether a scene change occurs between frames on the basis of the lost frame (S408). The determination of whether the scene change occurs is performed by analyzing video data of the previous frame preceding the lost frame and the frame following the lost frame. If it is determined that the scene change has occurred, it is then determined whether the lost frame is the same as the previous frame or the following frame. If the lost frame is the same as the previous frame, a forward reference is performed, while if the lost frame is the same as the following frame, a backward reference is performed. If it is determined that the scene change has not occurred, a bidirectional reference is performed.

Then, a process of extracting concealment reference points for a pixel constituting the lost frame using at least one frame except for the lost frame is performed according to the determined reference direction.

That is, in the case of the forward reference, the concealment reference points are extracted using the plural previous frames (S410), while in the case of the backward reference, the concealment reference points are extracted using one or more following frames (S414). Also, in the case of the bidirectional reference, the concealment reference points are extracted using the plural previous frames and one or more following frames (S412).

Then, concealment pixel value of the pixel constituting the lost frame is obtained by giving weight values to the extracted concealment reference points.

Specifically, in the case of the forward reference, the concealment pixel value of the pixel constituting the lost frame is obtained by giving the forward weight values to the extracted concealment reference points (S411), and in the case of the backward reference, the concealment pixel value of the pixel constituting the lost frame is obtained by giving the backward weight values to the extracted concealment reference points (S415). Also, in the case of the bidirectional reference, the concealment pixel value of the pixel constituting the lost frame is obtained by giving the forward weight values and the backward weight values and then giving directional weight values according to the reference directions to the extracted concealment reference points (S413). Here, higher forward or backward weight value is given as the absolute value of the motion vector becomes smaller, while lower forward or backward weight value is given as the absolute value of the motion vector becomes larger. Since the corresponding equations have already been explained, the detailed explanation thereof will be omitted.

Last, the frame is restored by performing the concealment using the concealment pixel value S416, so that the corresponding video is output (S418).

A computer-readable recording medium recorded with a program for executing in a computer the method according to an exemplary embodiment of the present invention would be within the scope of the present invention.

As described above, according to the present invention, when a frame loss occurs in an appliance that receives/outputs compressed moving images such as a digital TV receiver, a portable phone and a multimedia terminal, an error concealment in the unit of a frame can be effectively performed, and the deterioration of picture quality due to an error propagation can be minimized.

In addition, according to the present invention, errors in the error concealment prediction, which may occur in a video having frequent scene changes, can be significantly reduced, and the accuracy of prediction can be increased using many prediction reference points obtained by performing a multi-reference of the previous frame.

In addition, according to the present invention, the reflection of respective prediction values can be effectively adjusted by giving weight values according to the correlation between frames to the concealment reference points.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An error concealment method comprising:
   determining a reference direction of a lost frame by determining whether a scene change between frames has occurred based on the lost frame;
   extracting concealment reference points for a pixel of the lost frame by using at least one frame other than the lost frame according to the determined reference direction;
   determining motion vectors for pixels of the lost frame which correspond to spatial displacements between the pixels of the lost frame and the extracted concealment reference points;
   obtaining a concealment pixel value of the pixel of the lost frame by giving weight values to the extracted concealment reference points, wherein larger weight values are given as absolute values of motion vectors, become smaller, and smaller weight values are given as the absolute values of the motion vectors, become larger; and
   restoring the lost frame by concealing the pixel using the concealment pixel value.

2. The error concealment method of claim 1, wherein the determining the reference direction of the lost frame comprises determining whether the scene change between the frames has occurred based on the lost frame by analyzing video data of a previous frame that precedes the lost frame and video data of a following frame that follows the lost frame.

3. The error concealment method of claim 2, wherein the determining the reference direction of the lost frame further comprises:
   determining that the reference direction is forward if it is determined that the scene change has occurred and the lost frame is the same as the previous frame;
   determining that the reference direction is backward if it is determined that the scene change has occurred and the lost frame is the same as the following frame; and
   determining that the reference direction is bidirectional if it is determined that the scene change has not occurred.

4. The error concealment method of claim 3, wherein the extracting concealment reference points comprises:
   extracting the concealment reference points by using a plurality of previous frames if it is determined that the reference direction is forward;
   extracting the concealment reference points by using one or more following frames if it is determined that the reference direction is forward; and
   extracting the concealment reference points by using the plurality of previous frames and at least one following frame if it is determined that the reference direction is bidirectional.

5. The error concealment method of claim 4, wherein the obtaining a concealment pixel value comprises:
   obtaining the concealment pixel value of the pixel of the lost frame by giving forward weight values to the extracted concealment reference points if it is determined that the reference direction is forward;
   obtaining the concealment pixel value of the pixel of the lost frame by giving backward weight values to the extracted concealment reference points if it is determined that the reference direction is backward; and
   obtaining the concealment pixel value of the pixel of the lost frame by giving the forward weight values and the backward weight values, and then giving directional weight values according to the reference direction to the extracted concealment reference points if it is determined that the reference direction is bidirectional.

6. The error concealment method of claim 1, wherein the forward weight values are determined by:

$$w_{fi} = \frac{1}{1 + |MV_i|} \times \frac{1}{\sum_{k=1}^{N}\left(\frac{1}{1 + |MV_k|}\right)}, \left[\sum_{i=1}^{N} w_{fi} = 1\right],$$

wherein $w_{fi}$ is a forward weight value that is multiplied by a pixel value of an i-th forward reference point, $|MV_i|$ is a magnitude of a motion vector of the i-th forward reference point, $|MV_k|$ is a magnitude of a motion vector of a k-th forward reference point, N is a number of forward reference points, and i and k are integers.

7. The error concealment method of claim 1, wherein the backward weight values are determined by:

$$w_{bi} = \frac{1}{1 + |MV_i|} \times \frac{1}{\sum_{k=1}^{M}\left(\frac{1}{1 + |MV_k|}\right)}, \left[\sum_{i=1}^{M} w_{bi} = 1\right],$$

wherein $w_{bi}$ is a backward weight value that is multiplied by a pixel value of an i-th backward reference point, $|MV_i|$ is a magnitude of a motion vector of the i-th backward reference point, $|MV_k|$ is a magnitude of a motion vector of a k-th backward reference point, and M is a number of backward reference points.

8. The error concealment method of claim 5, wherein the directional weight values are determined by:

$$dw_f = \frac{ibn_b}{ibn_f + ibn_b},$$

$$dw_b = \frac{ibn_f}{ibn_f + ibn_b}$$

wherein $dw_f$ is a forward weight value, $dw_b$ is a backward weight value, $ibn_f$ is a number of intra-macroblocks of the previous frame, and $ibn_b$ is a number of intra-macroblocks of the following frame.

9. The error concealment method of claim 5, wherein the concealment pixel value of the pixel of the lost frame is determined by:

$$p(x, y) = dw_f \bullet \sum_{k=1}^{N} w_{fk} \cdot p(x_{fk}, y_{fk}) + dw_b \bullet \sum_{k=1}^{M} w_{bk} \cdot p(x_{bk}, y_{bk})$$

wherein $p(x,y)$ is the concealment pixel value for the pixel of the lost frame, $dw_f$ is a forward weight value, $dw_b$ is a backward weight value, $w_{fk} \cdot p(x_{fk}, y_{fk})$ is a value obtained by multiplying a pixel value of a k-th forward reference point by the forward weight value, N is a number of forward reference points, M is a number of backward reference points, $w_{bk} \cdot p(x_{bk}, y_{bk})$ is a value obtained by multiplying a pixel value of a k-th backward reference point by the backward weight value.

10. An error concealment apparatus comprising:
a reference direction determination unit which determines a reference direction of a lost frame by determining whether a scene change between frames has occurred based on the lost frame;
a concealment reference point extraction unit which extracts concealment reference points for a pixel of the lost frame by using at least one frame other than the lost frame according to the determined reference direction;
a weight value calculation unit which obtains a concealment pixel value of the pixel of the lost frame by giving weight values to the extracted concealment reference points, wherein larger weight values are given as absolute values of motion vectors, become smaller, and smaller weight values are given as the absolute values of the motion vectors, become larger; and
a frame restoration unit which restores the lost frame by concealing the pixel using the concealment pixel value,
wherein the motion vectors for pixels of the lost frame correspond to spatial displacements between the pixels of the lost frame and the extracted concealment reference points.

11. The error concealment apparatus of claim 10, wherein the reference direction determination unit comprises a scene change determination unit that determines whether the scene change between the frames has occurred based on the lost frame by analyzing video data of the previous frame that precedes the lost frame and the frame that follows the lost frame.

12. The error concealment apparatus of claim 11, wherein the reference direction determination unit determines that the reference direction is forward if the scene change determination unit determines that the scene change has occurred and the lost frame is the same as the previous frame, and determines that the reference direction is backward if the scene change determination unit determines that the scene change has occurred and the lost frame is the same as the following frame.

13. The error concealment apparatus of claim 12, wherein the reference direction determination unit determines that the reference direction is bidirectional if the scene change determination unit determines that the scene change has not occurred.

14. The error concealment apparatus of claim 13, wherein the concealment reference point extraction unit extracts the concealment reference points by using a plurality of previous frames if the scene change determination unit determines that the reference direction is forward; extracts the concealment reference points by using at least one following frame if the scene change determination unit determines that the reference direction is backward; and extracts the concealment reference points by using the plurality of previous frames and at least one following frame if the scene change determination unit determines that the reference direction is bidirectional.

15. The error concealment apparatus of claim 14, wherein the weight value calculation unit obtains the concealment pixel value of the pixel of the lost frame by giving forward weight values to the extracted concealment reference points if the scene change determination unit determines that the reference direction is forward; obtains the concealment pixel value of the pixel of the lost frame by giving backward weight values to the extracted concealment reference points if the scene change determination unit determines that the reference direction is backward; and obtains the concealment pixel value of the pixel of the lost frame by giving the forward weight values and the backward weight values, and then giving directional weight values according to the reference direction to the extracted concealment reference points if the scene change determination unit determines that the reference direction is bidirectional.

16. The error concealment apparatus of claim 10, wherein the forward weight values are determined by:

$$w_{fi} = \frac{1}{1 + |MV_i|} \times \frac{1}{\sum_{k=1}^{N}\left(\frac{1}{1 + |MV_k|}\right)}, \left[\sum_{i=1}^{N} w_{fi} = 1\right],$$

wherein $w_{fi}$ is a forward weight value that is multiplied by a pixel value of an i-th forward reference point, $|MV_i|$ is a magnitude of a motion vector of the i-th forward reference point, $|MV_k|$ is a magnitude of a motion vector of a k-th forward reference point, and N is a number of forward reference points.

17. The error concealment apparatus of claim 10, wherein the backward weight values are determined by:

$$w_{bi} = \frac{1}{1 + |MV_i|} \times \frac{1}{\sum_{k=1}^{N}\left(\frac{1}{1 + |MV_k|}\right)}, \left[\sum_{i=1}^{N} w_{bi} = 1\right],$$

wherein $w_{bi}$ is a backward weight value that is multiplied by a pixel value of an i-th backward reference point, $|MV_i|$ is a magnitude of a motion vector of the i-th backward reference point, $|MV_k|$ is a magnitude of a motion vector of a k-th backward reference point, and M is the number of backward reference points.

18. The error concealment apparatus of claim 15, wherein the directional weight values are determined by:

$$dw_f = \frac{ibn_b}{ibn_f + ibn_b},$$

$$dw_b = \frac{ibn_f}{ibn_f + ibn_b}$$

wherein $dw_f$ is a forward weight value, $dw_b$ is a backward weight value, $ibn_f$ is a number of intra-macroblocks of the previous frame, and $ibn_b$ is a number of intra-macroblocks of the following frame.

19. The error concealment apparatus of claim 15, wherein the concealment pixel value of the pixel of the lost frame is determined by:

$$p(x, y) = dw_f \cdot \sum_{k=1}^{N} w_{fk} \cdot p(x_{fk}, y_{fk}) + dw_b \cdot \sum_{k=1}^{M} w_{bk} \cdot p(x_{bk}, y_{bk}),$$

wherein $p(x,y)$ is the concealment pixel value for the pixel of the lost frame, $dw_f$ is a forward weight value, $dw_b$ is a backward weight value, $w_{fk} \cdot p(x_{fk}, y_{fk})$ is a value obtained by multiplying a pixel value of a k-th forward reference point by the forward weight value, N is a number of forward reference points, M is a number of backward reference points, and $w_{bk} \cdot p(x_{bk}, y_{bk})$ is a value obtained by multiplying a pixel value of a k-th backward reference point by the backward weight value.

20. A non-transitory computer-readable recording medium having recorded thereon a program a program for implementing an error concealment method comprising:

determining a reference direction of a lost frame by determining whether a scene change between frames has occurred based on the lost frame;

extracting concealment reference points for a pixel of the lost frame by using at least one frame other than the lost frame according to the determined reference direction;

determining motion vectors for pixels of the lost frame which correspond to spatial displacements between the pixels of the lost frame and the extracted concealment reference points;

obtaining a concealment pixel value of the pixel of the lost frame by giving weight values to the extracted concealment reference points, wherein larger weight values are given as absolute values of motion vectors, and smaller weight values are given as the absolute values of the motion vectors, become larger; and restoring the lost frame by concealing the pixel using the concealment pixel value.

\* \* \* \* \*